(12) United States Patent
McDonald

(10) Patent No.: US 6,848,144 B1
(45) Date of Patent: Feb. 1, 2005

(54) DUST COLLECTION CONVERSION DEVICE

(76) Inventor: Bernard A. McDonald, 252 Hammock Dr., Palm Harbor, FL (US) 34683

( * ) Notice: Subject to any disclaimer, the term of this patent is extended or adjusted under 35 U.S.C. 154(b) by 299 days.

(21) Appl. No.: 10/076,542

(22) Filed: Feb. 15, 2002

(51) Int. Cl.$^7$ .............................. A47L 9/24; A47F 5/12
(52) U.S. Cl. ..................... 15/246.2; 15/310; 15/323; 15/327.6; 248/124.1; 248/309.1
(58) Field of Search ................... 15/310, 323, 329, 15/353, 327.6, 246.2, 268; 248/122.1, 124.1, 309.1, 316.7, 316.1, 200, 80, 75, 81

(56) References Cited

U.S. PATENT DOCUMENTS

| | | | | |
|---|---|---|---|---|
| 505,060 | A | * | 9/1893 | Mills ........................ 248/124.2 |
| 2,450,172 | A | * | 9/1948 | Stoner .......................... 15/323 |
| 2,453,863 | A | * | 11/1948 | Salisbury ..................... 269/101 |
| 2,506,897 | A | * | 5/1950 | Sheker ........................ 248/303 |
| 2,839,102 | A | | 6/1958 | Kido |
| 3,322,169 | A | | 5/1967 | Hilliard |
| 3,509,590 | A | * | 5/1970 | Koshiyama ................... 15/323 |
| 3,646,712 | A | | 3/1972 | Quintana |
| 3,709,585 | A | * | 1/1973 | Tsai ............................ 359/860 |
| 3,958,474 | A | | 5/1976 | Kreitz |
| 4,253,362 | A | | 3/1981 | Olon |
| 4,426,857 | A | * | 1/1984 | Epstein ......................... 68/222 |
| D421,212 | S | | 2/2000 | Dunn |
| 6,588,052 | B2 | * | 7/2003 | Iversen ......................... 15/323 |

* cited by examiner

Primary Examiner—Robert J. Warden, Sr.
Assistant Examiner—Laura C Cole

(57) ABSTRACT

A dust collection conversion device for facilitating removal of dust from the area of work piece when a user is working on the work piece. The dust collection conversion device includes a frame assembly being designed for being coupled to a top of the shop vacuum. The frame assembly has a base member and a stanchion member. The base member is designed for coupling to the shop vacuum. The stanchion member is coupled to the base member. An arm member is coupled to the stanchion member of the frame assembly. The arm member is designed for coupling to a hose of the shop vacuum for directing the hose towards a work piece for vacuuming dust when the shop vacuum is turned on.

4 Claims, 2 Drawing Sheets

DUST COLLECTION CONVERSION DEVICE

BACKGROUND OF THE INVENTION

1. Field of the Invention

The present invention relates to dust collectors and more particularly pertains to a new dust collection conversion device for facilitating removal of dust from the area of work piece when a user is working on the work piece.

2. Description of the Prior Art

The use of dust collectors is known in the prior art. U.S. Pat. No. 3,958,474 describes a device for removing dust from the area of a radial arm saw. Another type of dust collector is U.S. Pat. No. 4,253,362 having an apparatus for collecting sawdust produced by a circular saw.

While these devices fulfill their respective, particular objectives and requirements, the need remains for a device that has certain improved features that permit mobility when the work piece is moved from one tool to another.

SUMMARY OF THE INVENTION

The present invention meets the needs presented above by providing a frame assembly and an arm member that is coupled to a shop vacuum to allow the hose to be repositioned and directed towards the work piece as the work piece is transferred from one piece of equipment to another.

Still yet another object of the present invention is to provide a new dust collection conversion device that allows for mobility so that dust can be removed from the work area around the work piece no mater which tool is being used.

Even still another object of the present invention is to provide a new dust collection conversion device that allows the hose of the shop vacuum to directed towards the work piece for greater efficiency is removing dust.

To this end, the present invention generally comprises a frame assembly being designed for being coupled to a top of the shop vacuum. The frame assembly has a base member and a stanchion member. The base member is designed for coupling to the shop vacuum. The stanchion member is coupled to the base member. An arm member is coupled to the stanchion member of the frame assembly. The arm member is designed for coupling to a hose of the shop vacuum for directing the hose towards a work piece for vacuuming dust when the shop vacuum is turned on.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
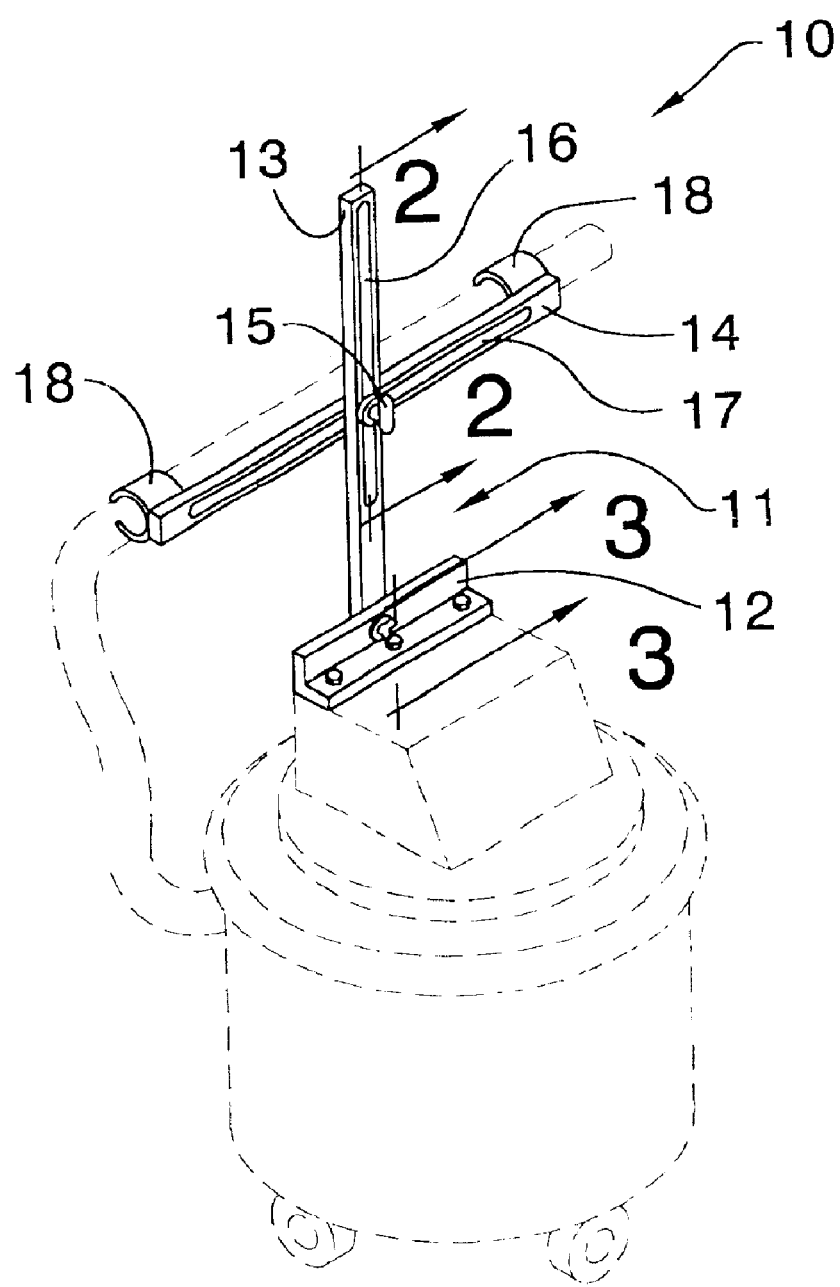
FIG. 1 is a perspective view of a new dust collection conversion device according to the present invention in use.
Figure 2:
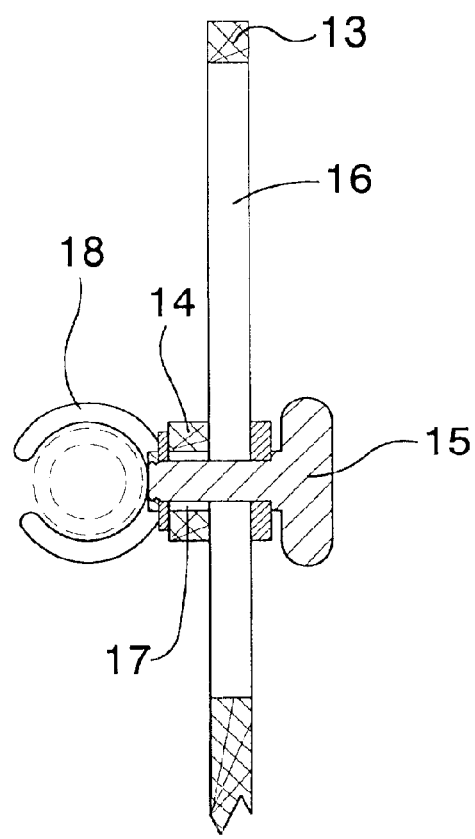
FIG. 2 is a cross-sectional view of the present invention taken along line 2—2 in FIG. 1.
Figure 3:
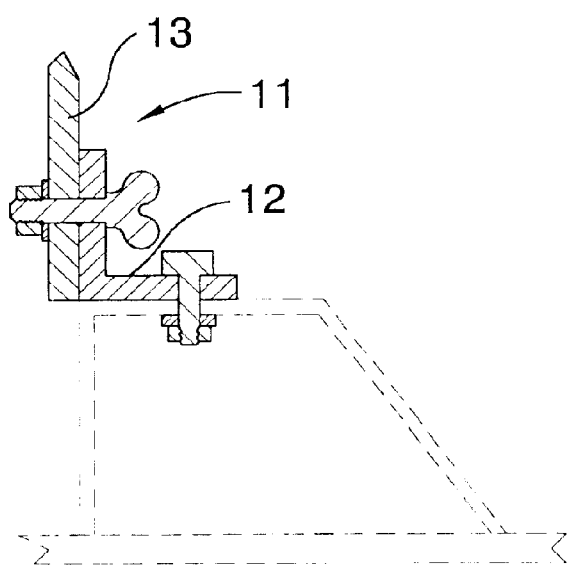
FIG. 3 is a cross-sectional view of the present invention taken along line 3—3 in FIG. 1.

With reference now to the drawings, and in particular to FIGS. 1 through 3 thereof, a new dust collection conversion device embodying the principles and concepts of the present invention and generally designated by the reference numeral 10 will be described.

As best illustrated in FIGS. 1 through 3, the dust collection conversion device 10 generally comprises a frame assembly 11 being designed for being coupled to a top of the shop vacuum. The frame assembly 11 has a base member 12 and a stanchion member 13. The base member 12 is designed for coupling to the shop vacuum. The stanchion member 13 is coupled to the base member 12.

An arm member 14 is coupled to the stanchion member 13 of the frame assembly 11. The arm member 14 is designed for coupling to a hose of the shop vacuum for directing the hose towards a work piece for vacuuming dust when the shop vacuum is turned on.

The frame assembly 11 has a coupling member 15. The coupling member 15 extends through the stanchion member 13 of the frame assembly 11. The coupling member 15 pivotally couples the arm member 14 to the stanchion member 13 for permitting the arm member 14 to be pivoted with respect to the stanchion member 13 of the frame assembly 11 whereby the arm member 14 is designed for directing the hose of the shop vacuum towards the work piece.

The stanchion member 13 of the frame assembly 11 has a stanchion slot 16. The coupling member 15 extends through the stanchion slot 16 in the stanchion member 13 for permitting positioning of the arm member 14 along a portion of a length of the stanchion member 13.

The arm member 14 has an arm slot 17. The coupling member 15 of the frame assembly 11 extends through the stanchion member 13 for permitting extension of the arm member 14 along a portion of a length of the arm member 14.

A plurality of clip members 18 are coupled to the arm member 14. Each of the clip members 18 is positioned opposite the stanchion member 13 of the frame assembly 11. The clip member is designed for receiving the hose of the shop vacuum for aligning the hose along the length of the arm member 14.

In use, the user couples the base member 12 of the frame assembly 11 to the top of the shop vacuum. The coupling member 15 is then used to adjust the height of the arm member 14 along the length of the stanchion member 13 and adjust the angle and extension length of the arm member 14 with respect to the stanchion member 13. The hose member of the shop vacuum is then secured to the clip members 18 and the shop vacuum is turned on to vacuum dust that is produced while working on the work piece.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dust collection conversion device for converting a shop vacuum to collect dust produced while working on wood, the dust collection conversion device comprising:

a frame assembly including means for coupling to a top of the shop vacuum, said frame assembly having a base member and a stanchion member, said base member being configured to couple to the shop vacuum, said stanchion member being coupled to said base member;

an arm member being coupled to said stanchion member of said frame assembly, said arm member including means for coupling to a hose of the shop vacuum for directing the hose towards a work piece for vacuuming dust when the shop vacuum is turned on; and said base member comprising a base portion and an extension portion, said extension portion being coupled to said base portion such that said extension portion extends upwardly from a side edge of said base portion, said stanchion member being coupled to said extension portion of said base member such that said stanchion member does not engage said base portion of said base member, said means for coupling to the shop vacuum being configured in a manner to orient said stanchion member to extend upwardly from the shop vacuum;

said frame assembly having a coupling member, said coupling member extending through said stanchion member of said frame assembly, said coupling member pivotally coupling said arm member to said stanchion member for permitting said arm member to be pivoted with respect to said stanchion member of said frame assembly such that said arm member is adapted for directing the hose of the shop vacuum towards the work piece.

2. The dust collection conversion device as set forth in claim 1, further comprising:

said stanchion member of said frame assembly having a stanchion slot, said coupling member extending through said stanchion slot in said stanchion member for permitting positioning of said arm member along a portion of a length of said stanchion member.

3. The dust collection conversion device as set forth in claim 1, further comprising:

said arm member having an arm slot, said coupling member of said frame assembly extending through said stanchion member for permitting extension of said arm member along a portion of a length of said arm member.

4. A dust collection conversion device for converting a shop vacuum to collect dust produced while working on wood, the dust collection conversion device comprising:

a frame assembly being adapted for being coupled to a top of the shop vacuum, said frame assembly having a base member and a stanchion member, said base member being adapted for coupling to the shop vacuum, said stanchion member being coupled to said base member;

an arm member being coupled to said stanchion member of said frame assembly, said arm member being adapted for coupling to a hose of the shop vacuum for directing the hose towards a work piece for vacuuming dust when the shop vacuum is turned on;

said frame assembly having a coupling member, said coupling member extending through said stanchion member of said frame assembly, said coupling member pivotally coupling said arm member to said stanchion member for permitting said arm member to be pivoted with respect to said stanchion member of said frame assembly such that said arm member is adapted for directing the hose of the shop vacuum towards the work piece;

said stanchion member of said frame assembly having a stanchion slot, said coupling member extending through said stanchion slot in said stanchion member for permitting positioning of said arm member along a portion of a length of said stanchion member;

said arm member having an arm slot, said coupling member of said frame assembly extending through said stanchion member for permitting extension of said arm member along a portion of a length of said arm member; and a plurality of clip members being coupled to said arm member, each of said clip members being positioned opposite said stanchion member of said frame assembly, said clip member being adapted for receiving the hose of the shop vacuum for aligning the hose along the length of said arm member.

* * * * *